Feb. 12, 1924.  
W. C. SMITH  
OVERDRIVE FOR MOTOR VEHICLES  
Filed Dec. 13, 1920  
1,483,389  
3 Sheets-Sheet 1
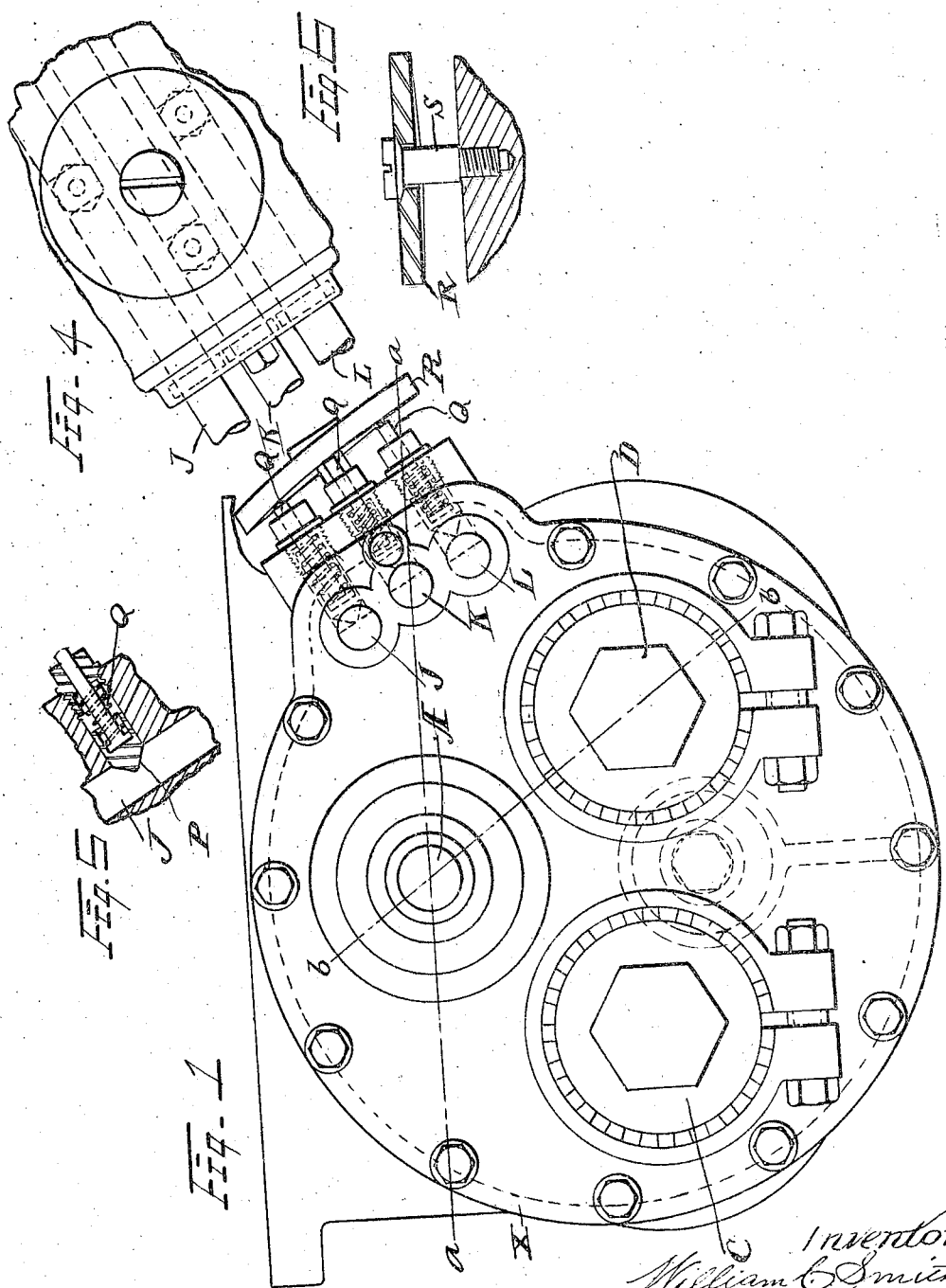

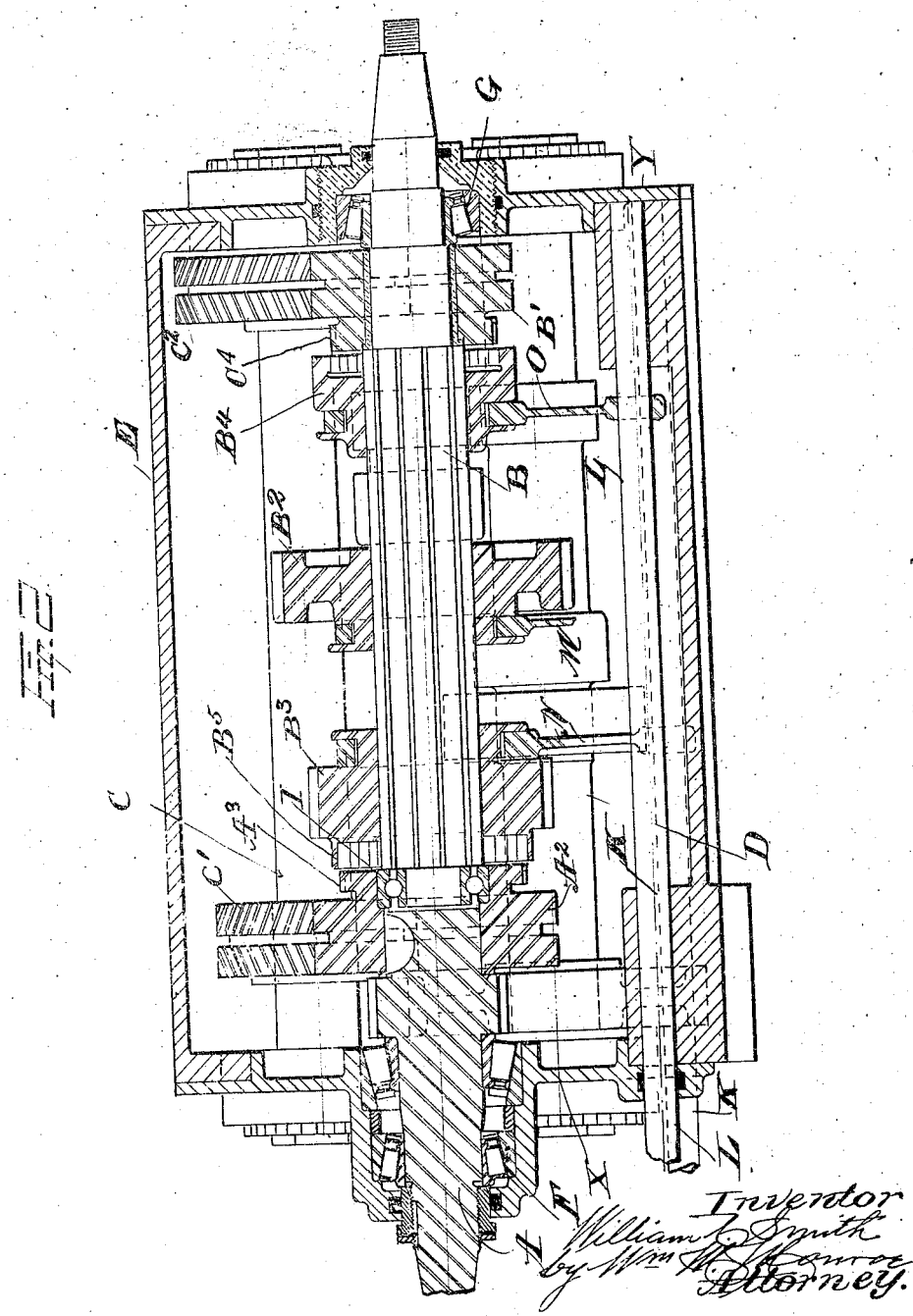

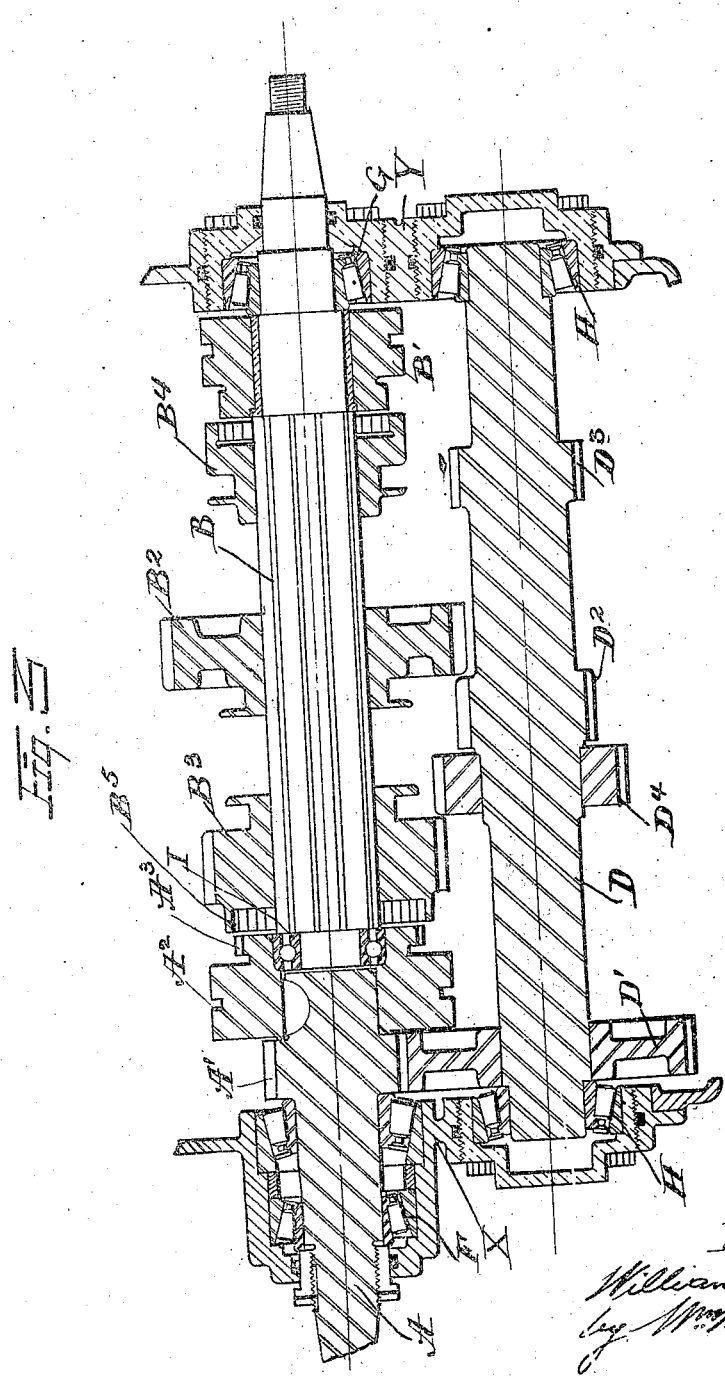

Patented Feb. 12, 1924.

1,483,389

UNITED STATES PATENT OFFICE.

WILLIAM C. SMITH, OF CLEVELAND, OHIO.

OVERDRIVE FOR MOTOR VEHICLES.

Application filed December 13, 1920. Serial No. 430,199.

*To all whom it may concern:*

Be it known that I, WILLIAM C. SMITH, a citizen of the United States, and resident of Cleveland, in the county of Cuyahoga and State of Ohio, have invented certain new and useful Improvements in Overdrive for Motor Vehicles; of which I hereby declare the following to be a full, clear, and exact description, such as will enable others skilled in the art to which it appertains, to make and use the same.

The objects of the invention are to provide a power transmission for a vehicle or other motive power operated by an explosion engine, by means of which a high degree of speed delivered by the transmission can be obtained from a motor running at a relatively low degree of speed, thus reducing the amount of fuel consumed necessary to obtain a predetermined amount of speed.

The device comprises an overdrive for transmitting motion to the rear axle, by means of which a degree of speed as high as is consistent with the motive power applied, and higher than the speed of the motor is transmitted to the rear axle. The transmission is applied through gears, preferably herringbone, which are always in engagement with each other and are always moving when the motor is in motion.

By this means the speed is increased by a predetermined amount over that of the motor at whatever speed the motor may be running. This effect is accomplished by means of a removable head or unit in which are mounted three shafts, comprising a direct drive and overdrive counter shafts, which are driven continuously by the main motor shaft and which carry the various gears employed to control the different speeds desired, and are alternately connected with a power transmission or propeller shaft, which is provided with a spline or splines and upon which the transmission gears for obtaining selected speeds are slidably mounted, and can be selectively engaged with the before mentioned controlling gears upon the direct drive and overdrive shafts. The transmission shaft is driven under ordinary motor speeds until the momentum of the machine permits the use of the overdrive.

By means of the employment of two counter shafts, opportunity is given for reducing the rate of speed of the motor and main drive shaft and for increasing the rate of speed of the transmission or propeller shaft in a manner that could not be efficiently obtained by means of only one counter shaft, since the fixed distance between the centers of the main and transmission shafts would limit the possible variation in the pitch diameter of the various change speed gears.

By the employment of two counter shafts the lowest practical reduction in speed below motor speed in the transmission or propeller shaft can be obtained, and also the highest practical increase in speed above motor speed can be obtained in the transmission or propeller shaft.

The invention also includes an efficient method and shifting means for engaging and disengaging in a selective manner the several controlling gears with the respective transmission gears with which they are engageable.

It also includes automatically acting means for locking the shifting mechanism for all other sets changing gears to retain them in their neutral positions when one set of change gears is in operation.

It includes a shifting rod for each set of change gears and a locking detent for each rod, so constructed that the movement of one rod to change its respective gears will operate the detents to lock all the other rods.

It includes a casing having removable heads which carry the shaft bearings. In this casing the shafts and change gears are inclosed in such a manner that all parts are easily accessible for inspection and repair.

It includes roller and ball bearings for the shafts and adjusting means therefor and packing means to retain the lubricating fluid.

It includes the use of annularly slotted herringbone gear having staggered teeth for the purpose of eliminating sound and for insuring the absolute continuous engagement of the teeth while running at a high rate of speed.

In these views, Fig. 1 is an end view of the front head and a portion of the gear case adjoining the motor. Fig. 2 is a horizontal section through the case on line *a—a*, Fig. 1. Fig. 3 is a similar section on line *b—b*, Fig. 1. Fig. 4 is a plan of the transmission shaft locking mechanism for the shifting rods. Figs. 5 and 6 are sections through locking mechanism.

In these views, A is the motor shaft. B is the transmission or spline carrying shaft, having its longitudinal axis in alignment with the motor shaft, A. C is the overdrive counter shaft and D is the main drive counter shaft. These shafts are parallel and are mounted in the detachable heads, X and Y, secured to the casing by the bolts, Z, Z, thus forming a unitary structure.

These shafts are mounted within the casing, E, upon roller bearings, F, G, and H, respectively, and the ball bearings, I, for the inner end of the shaft, B. The main drive shaft, D, is operatively connected with the motor shaft, A, by means of reducing spur gears, A' and D', which preferably reduces the motor speed by one-half, and the shaft, D, is always running when the motor runs. The overdrive shaft, C, is operatively connected with the motor shaft, A, by means of the herringbone gears, C' and A², respectively, at one end thereof, and is always running at a higher rate of speed than the motor shaft.

Upon the main drive counter shaft, D, are shown fixed gears, D², D³, and D⁴. The gear, D², is engageable with the slidable gear, B², upon the transmission shaft, B, and imparts the first or low speed thereto. The gear, D⁴, engages with a gear, B³, upon the spline shaft, B, and imparts the second or higher rate of speed thereto. A third rate of speed, equal to that of the motor shaft, is imparted to the transmission shaft, B, by means of the clutch member, B⁵, engageable by sliding it upon the shaft, B, into engagement with the clutch member on the gear, A³, upon the motor shaft.

The transmission shaft, B, is operatively connected with the overdrive counter shaft, C, by means of herringbone gears, C² and B'; the gear B' being loosely mounted upon the transmission shaft, B. When the clutch member B⁴, slidable upon the transmission shaft, B, is engaged with the corresponding clutch member C⁴, upon the gear, B', the fourth or highest rate of speed, higher than that of the motor shaft, is obtained.

Three shifting rods, J, K, and L, are employed, which operate the clutch arms, M, N, and O, alternately, to first engage the gear, B², with the first or low speed gear, D², second to engage the gear, B³, with the next higher speed gear, D⁴, or to throw the clutch member, B⁵, into engagement with the clutch member, A³, on the motor shaft, and third, to engage the clutch member, B⁴, with the clutch member, C⁴, on the transmission shaft, to impart thereto the highest rate of speed.

At P, P, P, are shown notches in the three shifting rods, and at Q, Q, Q, is shown a group of spring-pressed pins which engage these notches when the rods are shifted to place the gears in the neutral positions. A tilting cap, R, is secured centrally of this group of pins by means of a bolt, S, and the locking pins, Q, Q, are so arranged that when one pin is raised out of its notch by the movement of its respective rod, it will tilt the cap, which will engage the other pins and retain them in the notches of all the other shifting rods, thus locking them securely in place until the shifted rod has been returned to the neutral position.

Having described the invention, what I claim as new, and desire to secure by Letters Patent, is:

1. In a power transmission device, in combination, a motor shaft and a transmission shaft in alignment therewith, a speed reduction counter shaft and an overdrive counter shaft, permanent geared connections between said motor shaft and said counter shafts, reducing gears upon said speed reduction shaft for transmitting first and second rates of speed, corresponding gears slidably movable upon said transmission shaft, one of said sliding gears also engageable with said motor shaft for transmitting a third rate of speed, and a loose speed increasing gear for a fourth rate of speed, on said transmission shaft, and a corresponding gear upon the said overdrive shaft, cooperating clutch means upon said transmission shaft and speed increasing gear, a shifting device for moving each transmission gear from neutral to engaging positions, and a locking mechanism for each shifting device.

2. In a power transmission device, in combination, a motor shaft and a transmission shaft in alignment therewith, a speed reduction counter shaft and an overdrive counter shaft, permanent geared connections between said motor shaft and said counter shafts, reducing gears upon said speed reduction shaft for transmitting first and second rates of speed, corresponding gears slidably mounted upon said transmission shaft, one of said sliding gears also engageable with said motor shaft for transmitting a third rate of speed, and a loose speed increasing gear for a fourth rate of speed, secured upon said transmission shaft, and a corresponding gear upon the said overdrive shaft, cooperating clutch means upon said transmission shaft and speed increasing gear, a shifting device for moving each transmission gear from neutral to engaging positions, and a locking mechanism for each shifting device, and mechanism operated by the movement of one shifting device from the neutral position for locking the other shifting devices from movement.

3. In an overdrive transmission device, a unitary structure comprising, a casing, opposite removable heads for said casing, a motor shaft, and an aligned transmission shaft in said casing, adjustable bearings for said shafts in said heads, and a bearing for said transmission shaft in said motor shaft, a main driving counter shaft parallel with said motor and transmission shafts, an overdrive counter shaft, parallel with the aforesaid shafts, adjustable bearings for said counter shafts in the heads of said casing, said counter shafts in constant operative connection with said motor shaft, transmission gears slidably mounted upon said transmission shaft, reducing gears upon said main drive counter shaft, an increased speed gear upon said overdrive counter shaft clutch means and an intermediate gear mounted upon said transmission shaft for driving said increased speed gear, and shifting mechanism for moving predetermined gears upon said transmission shaft to engage with predetermined reduction gears upon said main drive counter shaft, and shifting mechanism operated alternately therewith to move said clutch means upon said transmission shaft into engagement with said intermediate gear, one of said shifting devices operating also to move one of said transmission gears on said transmission shaft into engagement with a gear on said motor shaft.

In testimony whereof, I hereunto set my hand this 15th day of November, 1920.

WILLIAM C. SMITH.

In presence of:—
WM. M. MONROE,
S. W. SANGSTER.